United States Patent
Bouckaert et al.

(10) Patent No.: US 7,966,656 B2
(45) Date of Patent: Jun. 21, 2011

(54) METHOD OF COUPLING A SWITCHED CIRCUIT NETWORK TO AN INTERNET PROTOCOL NETWORK

(75) Inventors: Philippe Bouckaert, Biot (FR); Hamid Wassifi, Juan les Pins (FR); David Clouaire, Mandelieu la Napoule (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1113 days.

(21) Appl. No.: 11/717,153

(22) Filed: Mar. 13, 2007

(65) Prior Publication Data
US 2007/0261113 A1 Nov. 8, 2007

(30) Foreign Application Priority Data
Mar. 14, 2006 (EP) .................................. 06300226

(51) Int. Cl.
*H04L 29/00* (2006.01)
(52) U.S. Cl. ....................................................... 726/12
(58) Field of Classification Search ...................... 726/12
See application file for complete search history.

(56) References Cited

U.S. PATENT DOCUMENTS
6,931,111 B1   8/2005  Coffee
2001/0056476 A1*  12/2001  Benayoun et al. ............ 709/218
2004/0174864 A1*  9/2004  Klaghofer ..................... 370/352
2006/0023694 A1   2/2006  Wilson et al.
2007/0184860 A1*  8/2007  Jansson ......................... 455/466

FOREIGN PATENT DOCUMENTS
WO    2006004995 A    1/2006

OTHER PUBLICATIONS
European Patent Office~Communication pursuant to Article 94(3) EPC~dated Mar. 20, 2008~1 page~Munich, Germany.
European Patent Office~European Search Report~dated Dec. 6, 2006~5 pages~Rijswijk. The Netherlands.

* cited by examiner

*Primary Examiner* — Vivek Srivastava
*Assistant Examiner* — Anthony Brown

(57) ABSTRACT

A method of operating a gateway is disclosed to manage communications between a switched circuit network and an internet protocol network using a gateway. The method includes receiving at the gateway, a service call requesting the service for routing to an application server on the internet protocol network. If the application server is available the service call is routed to the first application server and the gateway generates an entry in its database. The entry includes the service identifier and the first application server identifier. If the application server is not available to accept the service call and the service call is routed to the application server when it is not available, the method includes sending a control message to the calling party on the switched circuit network.

18 Claims, 5 Drawing Sheets

METHOD OF COUPLING A SWITCHED CIRCUIT NETWORK TO AN INTERNET PROTOCOL NETWORK

This application claims priority from European Patent Application 06300226.5 filed Mar. 14, 2006. The entire content of the aforementioned application is incorporated herein by reference.

BACKGROUND AND PRIOR ART

It is a general tendency that the performance, availability, and reliability of networks based on the internet protocol, so-called internet protocol (IP) networks is increasing. Similarly, switched circuit networks (SCN), including public switched telephone networks (PSTN), have been developed and improved for many decades and switched circuit networks work very reliably. Switched circuit networks are commonly used to interconnect mobile and fixed telephones. As the number of users and their respective bandwidth requirements increase it becomes necessary to increase the capability of switched circuit networks. Expanding and maintaining switched circuit networks requires however massive investments which could be saved to some extend if telephone services could be provided by IP networks. Switched circuit network carriers are therefore willing to consolidate both, IP networks and switched circuit networks.

In a switched circuit network two types of data traffic are used: media data traffic and signaling data traffic. Both types of data traffic can be migrated separately from switched circuit networks to IP networks, because they rely on different technologies.

In most public switched circuit networks the signaling data traffic is carried in a packet network which is referred to as Signaling System 7 (SS7). The Internet Engineering Task Force (IETF) has initiated the SIGTRAN working group which defined open standards for transporting SS7 signaling data traffic over IP networks. The architecture that has been defined by the SIGTRAN working group consists of three components: a standard internet protocol, a common signaling transport protocol that supports a common set of reliable transport functions for signaling transport which is referred to as stream control transport protocol (SCTP), and an adaptation sub-layer that supports specific primitives, such as management indications that are required by a particular signaling application protocol.

One new adaptation sub-layer amongst others is the Signaling Connection Control Part (SCCP) user adaptation layer which is abbreviated as SUA layer. On the SUA layer a protocol is defined for the transport of any SCCP user signaling. This protocol is called SUA protocol and defined by IETF.

For this protocol the IETF has defined two main entities, a signaling gateway and a SUA application server. The signaling gateway interconnects a SS7 network and an IP network. One or more SUA application servers are located on the IP network which can be requested by a SCCP user signaling on the SS7 network via the signaling gateway. Alternatively, a SUA application server on the IP network can request a SCCP user signaling on the SS7 network via the signaling gateway. A SCCP user signaling is also called a SCCP service and a SUA application server is also referred to as application server.

An SCCP service in the SS7 network is declared by use of a point code (PC) and a subsystem number (SSN). On the SUA layer, an application server is declared by a point code, a subsystem number and other parameters such as for example a global title (GT), a calling party address, or a mobile application part (MAP) parameter. Several application servers can share a point code and a subsystem number. They are separated by an additional parameter such as the MAP parameter which is unique to a specific application server comprised in the group of application servers that share the same point code and subsystem number.

When the signaling gateway receives a service call from the SS7 network which requests a service, the service call is routed to the application server which implements the service on the internet protocol network if the application server is available. If the application server is unavailable, the signaling gateway informs the calling party which has sent the service call by use of a control message that the application server is unavailable. The situation becomes more complex if a service call is routed to several application servers of which some are available and others are unavailable or if the service call is routed to an application server which is not available but the application server shares its point code and its subsystem number with another application server. For such complex situations it is not clear when control messages are sent to a calling party. There is therefore the need for an improved method for the distribution of control messages to calling parties.

SUMMARY OF THE INVENTION

In accordance with an embodiment of the invention, there is provided a method of coupling a switched circuit network and an internet protocol network. The switched circuit network and the internet protocol network are interconnected by a gateway. The gateway comprises a database. The switched circuit network comprises a service which is identified by a service identifier. The internet protocol network comprises a group of application servers and the group of application servers comprises at least one application server. Each of the at least one application server are identified by a specific application server identifier. The method comprises the step of generating an entry in the database in response to a service call requesting the service if the service call is routed to an available application server, wherein the service call is received from a calling party located on the switched circuit network and wherein the available application server is comprised in the group of application servers. The entry comprises the service identifier and the specific application server identifier of the available application server. The method further comprises the step of deleting the entry after a given period of time. The method further comprises the step of sending a control message to a calling party in response to the service call if the service call is routed to an unavailable application server and if only the specific application server identifier of the unavailable application server is comprised in the database or if the service call is routed to an unavailable application server and if all application servers of said group of application servers are unavailable and if the specific application server identifiers of all application servers of said group of application servers are comprised in the database. A timestamp can for example be comprised in the entry. The entry is deleted after a given period of time has been spent with respect to the timestamp.

The method in accordance with the invention is particularly advantageous as it allows to generate and to send a control message in response to a service call for a service which is implemented by several application servers and whereof some application servers might be available and others might be unavailable.

In accordance with an embodiment of the invention, the method further comprises the step of sending a control message to a calling party in response to a control message request received from said calling party, wherein the control message request requests the availability of a service which is linked to an application server, and wherein the application server is comprised in the group of application servers. The control message is sent if the application server is unavailable and if only the specific application server identifier of the application server is comprised in the database or if all application servers of said group of application servers are unavailable and if the specific application server identifiers of all application servers of the group of application servers are comprised in said database.

Thus after the reception of a control message request which is sent from a calling party in order to request the availability of an application server which is unavailable, the database is scanned for the specific application identifier of the application server. If only this identifier is stored, then the control message is sent to the calling party. If all other application servers comprised in the group of application servers are unavailable and if the specific application server identifiers of all application servers are stored in the database, then the control message is sent as well.

Since the database is always up to date, a dynamic distribution of the control messages is ensured and thus the performance of the coupled switched circuit network and the internet protocol network is increased.

In accordance with an embodiment of the invention, the group of application servers comprises only a first and a second application server, and the method comprises the step of sending a control message to the calling party in response to a service call requesting the first application server or in response to a control message request requesting the availability of the first application server if the first application server is unavailable and if said database comprises only the specific identifier of the first application server or if said first application server and said second application server are unavailable and if said database comprises the specific identifier of the first application server and of the second application server. The service call or the control message request is silently discarded if the first application server is unavailable and if the second service call is available and if said database does comprise the specific identifier of said second application server.

In accordance with an embodiment of the invention, the database comprises a list. The list comprises rules for assigning an application server comprised in the group of application servers to the service and the method comprises the step of sending a control message in response to a status change of the application server if the service identifier of the service to which the application server is assigned by the rules is comprised in the database.

In accordance with an embodiment of the invention, the switched circuit network is a signaling system network, the gateway is a signaling gateway, the at least one service is a signaling connection control part (SCCP) service, the service identifier is a point code which is assigned to the SCCP service, the group of application servers is a group of application servers sharing the same point code and subsystem number, the application server identifier is a MAP parameter, the control message is a subsystem prohibited SCCP management message, and the service call is a unit data SCCP message.

In accordance with an embodiment of the invention, the control message request is a subsystem test SCCP management message, and the application server status specifies the availability of said application server.

In accordance with an embodiment of the invention, the signaling system network is a signaling system 7 network.

In another aspect, the invention relates to a computer program product which comprises computer executable instructions for performing a method in accordance with the invention.

In another aspect, the invention relates to an electronic apparatus for coupling a switched circuit network and an internet protocol network. The switched circuit network and the internet protocol network are interconnected by a gateway, which comprises a database. The switched circuit network comprises a service which is identified by a service identifier. The internet protocol network comprises a group of application servers. The group of application servers comprises at least one application server. Each of the at least one application server is identified by a specific application server identifier. The electronic apparatus comprises means for generating an entry in the database if a service call requesting the service is routed to an available application server of said group of application servers and means for receiving the service call from a calling party located on the switched circuit network. The electronic apparatus further comprises means for deleting the entry after a given period of time has been spent with respect to a timestamp comprised in the entry and means for sending a control message to the calling party in response to the service call if the service call is routed to an unavailable application server, and if only the specific application server identifier of the unavailable application server is comprised in the database or if the service call is routed to an unavailable application server and if the specific application server identifiers of all application servers of the group of application servers are comprised in the database, and if all application servers are unavailable.

In another aspect, the invention relates to a gateway for coupling a switched circuit network and an internet protocol network. The switched circuit network and the internet protocol network are interconnected by the gateway. The switched circuit network comprises a service which is identified by a service identifier and the internet protocol network comprises a group of application servers. The group of application servers comprises at least one application server and each of the at least one application servers are identified by a specific application server identifier. The gateway comprises a storage device for storing a database and a generator for generating an entry in the database in response to a service call requesting the service if the service call is routed to an available application server. The gateway comprises further a receiver for receiving the service call from a calling party, and a clock used for the generation of a timestamp which is also stored in the database.

The gateway further comprises an component employed for deleting the entry after a given period of time has been spent with respect to the timestamp, a router for routing a service call to at least one application server, a component for generating a control message, and a component for sending the control message to the calling party in response to the service call if the service call is routed to an unavailable application server, and if only the specific application server identifier of the unavailable application server is comprised in the database or if the service call is routed to an unavailable application server and if the specific application server identifiers of all application servers of the group of application servers are comprised in the database, and if all application servers are unavailable

BRIEF DESCRIPTION OF THE DRAWINGS

In the following preferred embodiments of the invention will be described in greater detail by way of example only making reference to the drawings in which.

DETAILED DESCRIPTION

Figure 1:
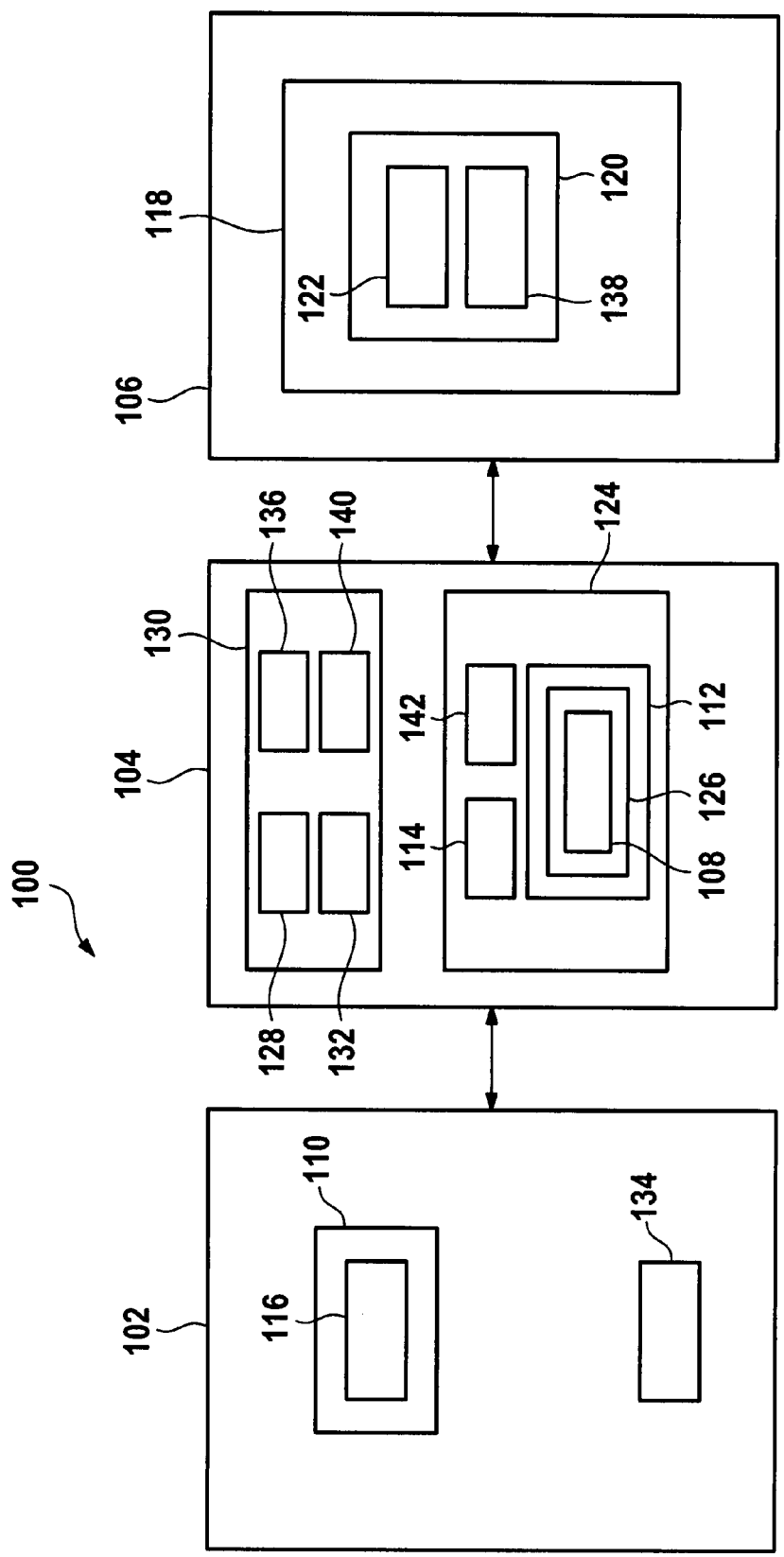
FIG. 1 shows a block diagram of a switched circuit network connected by a gateway to an internet protocol network.

FIG. 1 depicts a block diagram of a switched circuit network 102 interconnected by a gateway 104 to an internet protocol network 106. The switched circuit network 102 comprises at least one service 110 which is specified by a service identifier 116. The gateway comprises a microprocessor 130 and a non-volatile memory device 124. The microprocessor 130 executes a non-transitory computer program product 132 which comprises instructions that are adapted to perform the method in accordance with the invention. The non-volatile memory device 124 comprises a database 112 and a list 142. The internet protocol network 106 comprises a group of application servers 118. The group of application servers comprises at least one application server 120 which is identified by an application server identifier 122. The application server status 138 specifies the availability of the application server. Thus the application server status can have to logical parameters, which is either available or unavailable.

In operation, the microprocessor 130 receives a service call 128 from a calling party 134 which is located on the switched circuit network 102. The service call 128 requests the service 110 which is linked to the application server 120. If the application server status 138 of the application server 120 is available, then the service call 128 is routed to the application server 120. An entry 126 is generated in the database which comprises the service identifier 116, the application server identifier 122 and a timestamp 108. The timestamp 108 is used in order to be able track back the point in time when the service call 128 has been linked to the application server 120 and in order to delete the entry 126 after a given period of time 114 has been passed with respect to the timestamp 108. If the application server status 138 specifies the application server 120 to be unavailable, then the database is checked if only the specific identifier of the application server 120 is stored in the database. If this is the case, a control message 136 is generated by the microprocessor 130 in accordance with instructions obtained by executing the computer program product 132 and the control message 136 is sent to the calling party 134. If this is not the case, it is checked if all application servers comprised in the group of application servers 118 are unavailable and if the specific identifiers of all application servers of the group of application servers 118 are comprised in the database 112. If this is the case, the control message 136 is sent to the calling party 134. In all other cases, the service call 128 is silently discarded.

The calling party 134 can also send a control message request 140 which is received by the microprocessor 130. The control message request 140 requests the availability of the application server 120. If the application server status 138 has the status "unavailable", this indicates that the application server 120 can not provide the requested service. As a consequence, the database 112 is checked whether only the application server identifier 122 of the application server 120 of the group of application servers 118 is stored in the database 112 or if additional application server identifiers of application servers of the same group are also stored in the database 112. If the first case applies, i.e. only the application server identifier 122 but not other application server identifiers of the same group of application servers 118 being stored in the database 112, a control message 136 is generated by the microprocessor 130 by executing the computer program product 132 and the control message is sent to the calling party 134.

If one or more additional application server identifiers are stored in the database 112 in addition to the application server identifier 122, it is checked if (i) all application servers comprised in the group of application servers 118 are unavailable and if (ii) the application server identifiers of all application servers of the group of application servers 118 are stored in the database 112. If both conditions (i) and (ii) are fulfilled, the control message 136 is sent to the calling party 134. In all other cases, the service call 128 is silently discarded.

The application server status 138 can also change from available to unavailable and vice versa. The list 142 comprises rules by which the services that are linked to the application server 120 can be identified. In the case described here, service 110 is linked to the application server 120. If the status of the application server changes, then the database 112 is checked for an entry which implies that the service call 128 has been routed to the application server 120 within a given period of time. If this entry is found then a control message is send to the calling party 134.

In an embodiment of the invention, the switched circuit network 102 is a signaling system 7 (SS7) network and the gateway 104 is a signaling gateway. The service 110 is a signaling control connection part (SCCP) service and the service identifier is the point code (PC) which hosts the SCCP service. The application server 120 is an SUA application server and the application server identifier 122 is the point code (PC), the subsystem number (SSN) and another parameter such as a global title (GT), or a mobile application part (MAP) parameter. The application server identifier 122 identifies each application server uniquely. The group of application severs comprises all application servers which share the same point code and the same subsystem number. The control message 136 is a subsystem prohibited (SSP) SCCP management message and the control message request 140 is a subsystem test (SST) SCCP management message.

Figure 2:
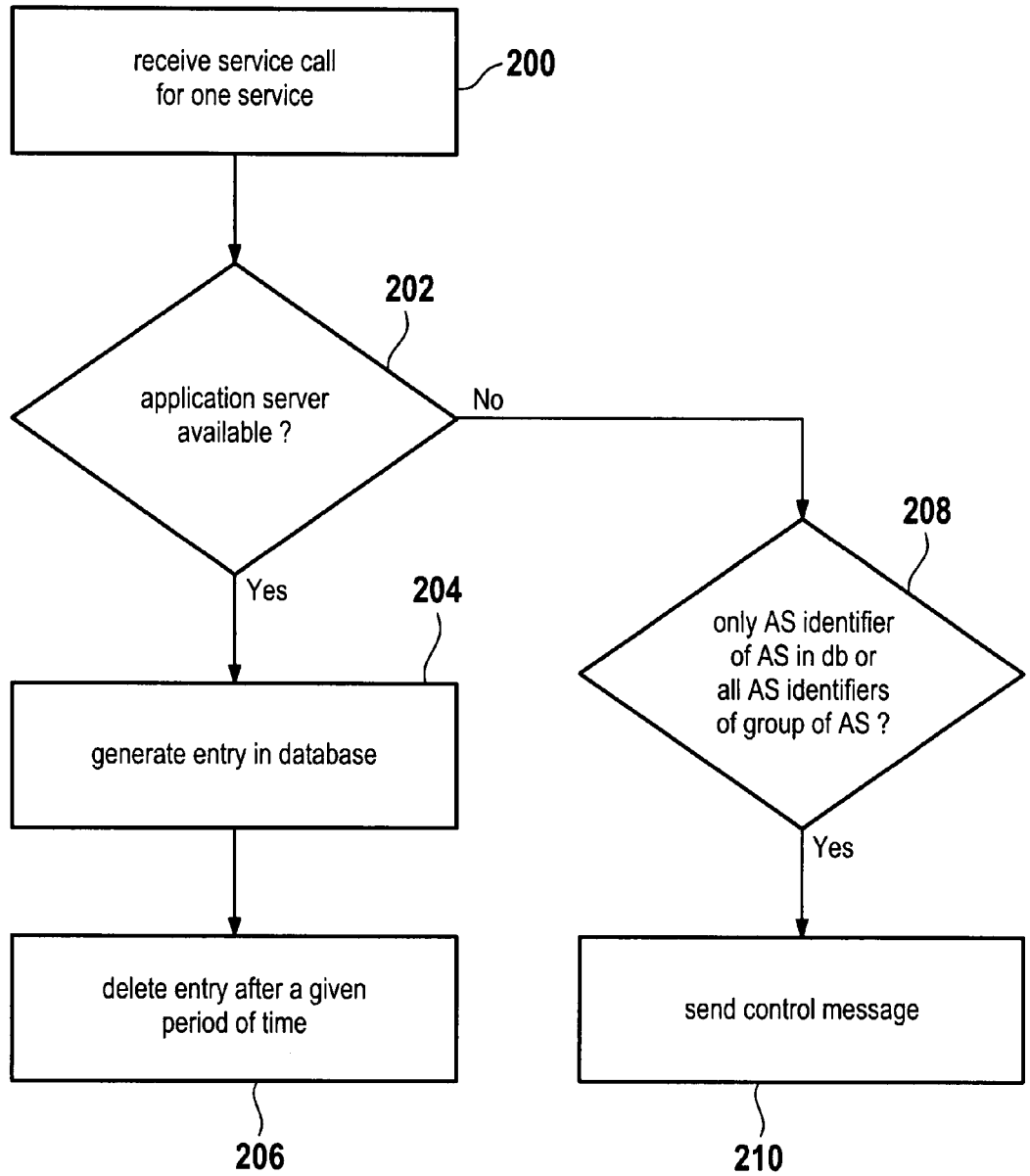
FIG. 2 depicts a flow diagram.

FIG. 2 depicts a flow diagram which describes the basic steps performed by the method in accordance with the invention schematically. In step 200, a service call is received which requests one service. The service, which is located on the switched circuit network, is linked to an application server. In step 202, the availability of the application server is determined. If the application server is available, the service call is routed to the application server and an entry is created in the database which comprises the service identifier of the service, the application server identifier of the application server and the timestamp. In step 206 the entry is deleted after a given period of time.

If the application server is determined in step 202 to be unavailable, then the database is checked whether only the application server identifier of the application server requested by the service call is stored in the database. If this is the case, i.e. only that application server identifier being stored in the database, a control message is sent in step 210 to the calling party from which the service call was received. If this is not the case, i.e. if more than one application server identifier of the same group is stored in the database, it is furthermore checked whether (i) all application server identifiers of that group are stored in the database and whether (ii)

all application serves of that group are unavailable. If both conditions (i) and (ii) are fulfilled, a control message is also sent in step 210 to the calling party from which the service call was received.

Figure 3:
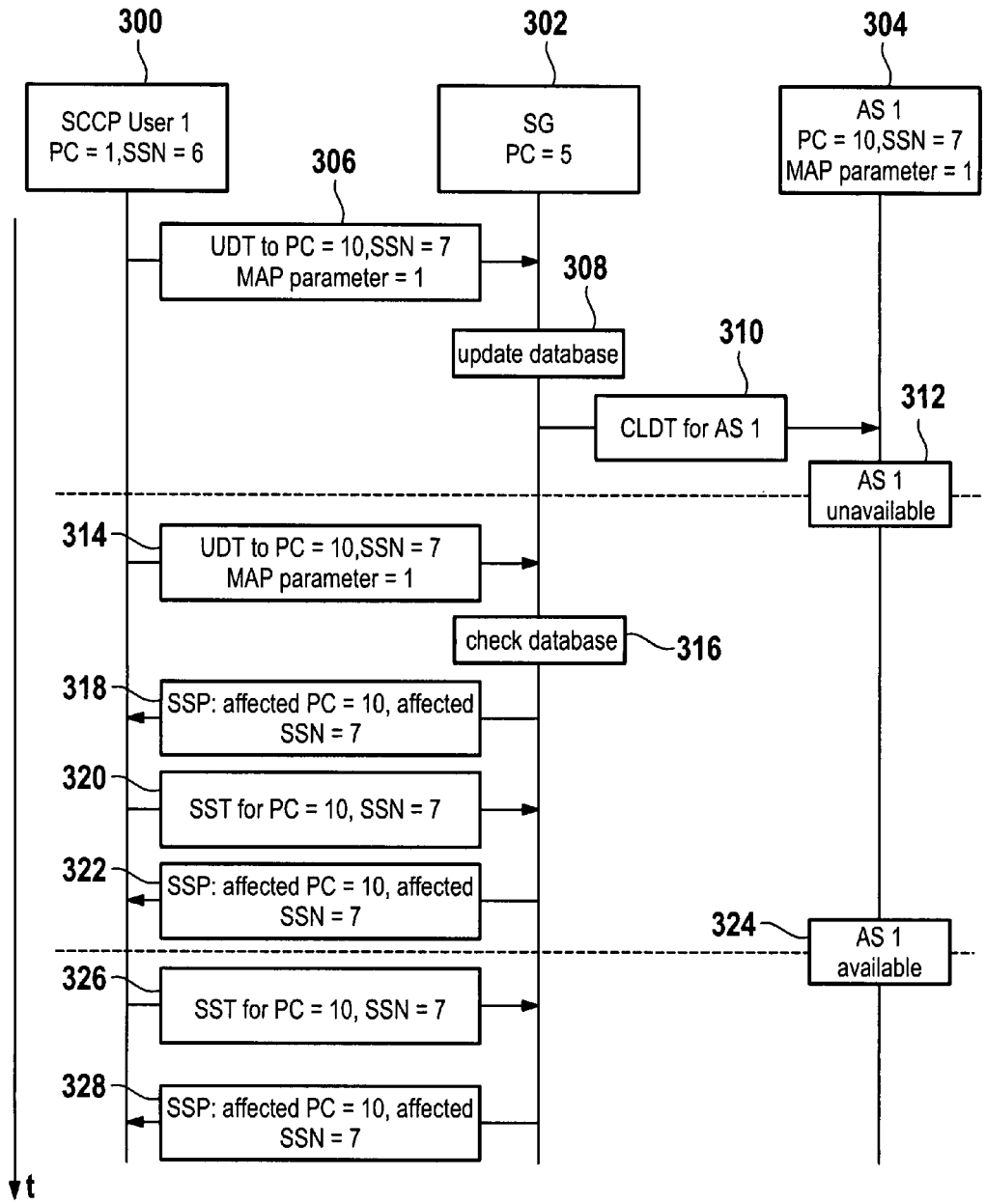
FIG. 3 depicts a sequence of operation diagram.

FIG. 3 depicts a sequence of operation diagram, in which a service call, referred to as SCCP user 1 300, is requesting a SCCP service which is linked to the application server AS1 304. The SCCP user 1 300 is identified by the point code PC=1, which corresponds to the specific service identifier, and the subsystem number SSN=6. The application server AS1 304 is identified by a point code PC=10, a subsystem number SSN=7, and a MAP parameter=1. The application server AS1 304 is the only application server with PC=1 and SSN=7. Thus AS1 is the only application server comprised in the group of application servers.

In step 306 the SCCP user 1 is requesting AS1 304 by sending a service call in form of a unit data message (UDT) to the signaling gateway (SG) 302, from where it is routed to application server AS1 304. In step 308 the database is updated by an entry in which the point code PC=1 of the SCCP user 1 300 is stored along with the PC=10, the subsystem number SSN=7, the MAP parameter MAP=1 of the application server 1 304 and along with a timestamp. In step 310 a connectionless data message (CLDT) is sent to application server AS1 304. Then the application server AS1 304 becomes unavailable as indicated in step 312. The application server AS1 304 can, for example, become unavailable due to a server outage, or because it has reached its capacity limit and can not respond to additional service calls. In step 314, the SCCP user 1 300 is sending a UDT message to the Signaling Gateway 302, requesting access to AS1 304. Since AS1 304 is unavailable, the database is checked in step 316 for an entry comprising the point code of the SCCP service (PC=1) and the point code (PC=10) and the subsystem number (SSN=7) of the application server 304. Since in step 308 an entry has been made comprising the point code of the SCCP service 300 and the point code and the subsystem number of application server AS1 304, the application server 1 is determined to be unavailable. In step 318 a subsystem prohibited (SSP) SCCP management message is sent to SCCP user 1 300 which indicates that the application server PC=10 and SSN=7 is affected.

In step 320, a subsystem test (SST) message is received from the SCCP user 1 300 in which the availability of the application server AS1 304 is enquired. By checking the database as described above, it is determined by the method in accordance with the invention that AS1 304 is unavailable. In step 322 a subsystem prohibited message is therefore sent to the SCCP user 1 300. In step 324, the application server 1 304 becomes available again. In step 326 another subsystem test message is received which is responded by a subsystem allowed message in step 328.

Figure 4:
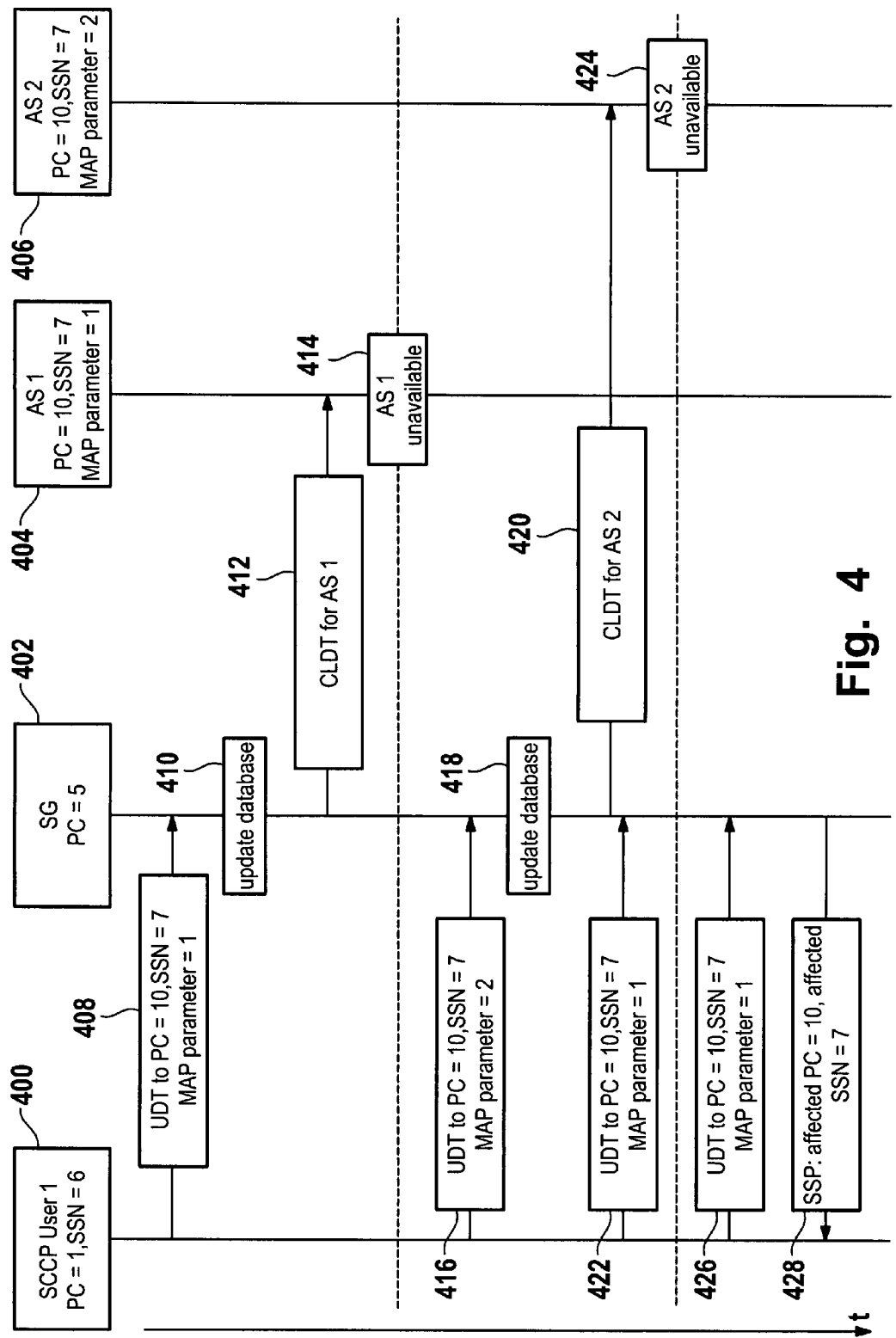
FIG. 4 depicts a sequence of operation diagram.

FIG. 4 depicts a sequence of operation diagram, in which a calling party, a so called SCCP user 1 400, is requesting an application server 1 404 and an application server 2 406. The specific server identifier of AS1 404 is the point code (PC=10), the subsystem number (SSN=7) and the MAP parameter (MAP=1). The specific server identifier of AS2 406 is the point code (PC=10), the subsystem number (SSN=7) and the MAP parameter (MAP=2). AS1 and AS 2 share the same point code and subsystem number. They are the two application servers comprised in the group of application servers which is characterized by the same point code and the same subsystem number.

In step 408, a SCCP service call in form of a unit data message (UDT) is sent to the signaling gateway 402, which is routed to application server 1 404. In step 410 the database is updated by an entry comprising the point code of the SCCP service call (PC=1), the point code, the subsystem number, and the MAP parameter (PC=10, SSN=7, MAP=1) of the application server AS1 404. Additionally the timestamp is added to that entry. In step 412 a CLDT message is sent to application server 1 404. In step 414, application server AS1 404 becomes unavailable.

In step 416, a SCCP service call is received from SCCP user 1 400 which is requesting application server 2 406. Application server 1 404 and application server 2 406 have identical point codes and subsystem numbers but differ in the value of the MAP parameter (MAP=2 for AS2 406). In step 418 the database is updated by adding the point code, subsystem number and MAP parameter of AS2 406 to the database. In step 420 a CLDT message is sent to application server 406.

In step 422 an SCCP service call for AS1 404 is received. Since AS1 404 is unavailable and AS2 406, is still available, the message is silently discarded. If in the received request an error option is activated then a subsystem failure message is sent to the SCCP user 1.

In step 424, AS2 406 becomes unavailable so that for the SCCP service call which is received in step 426 and which requests application server 1 408, a SSP SCCP management message is generated in step 428.

Figure 5:
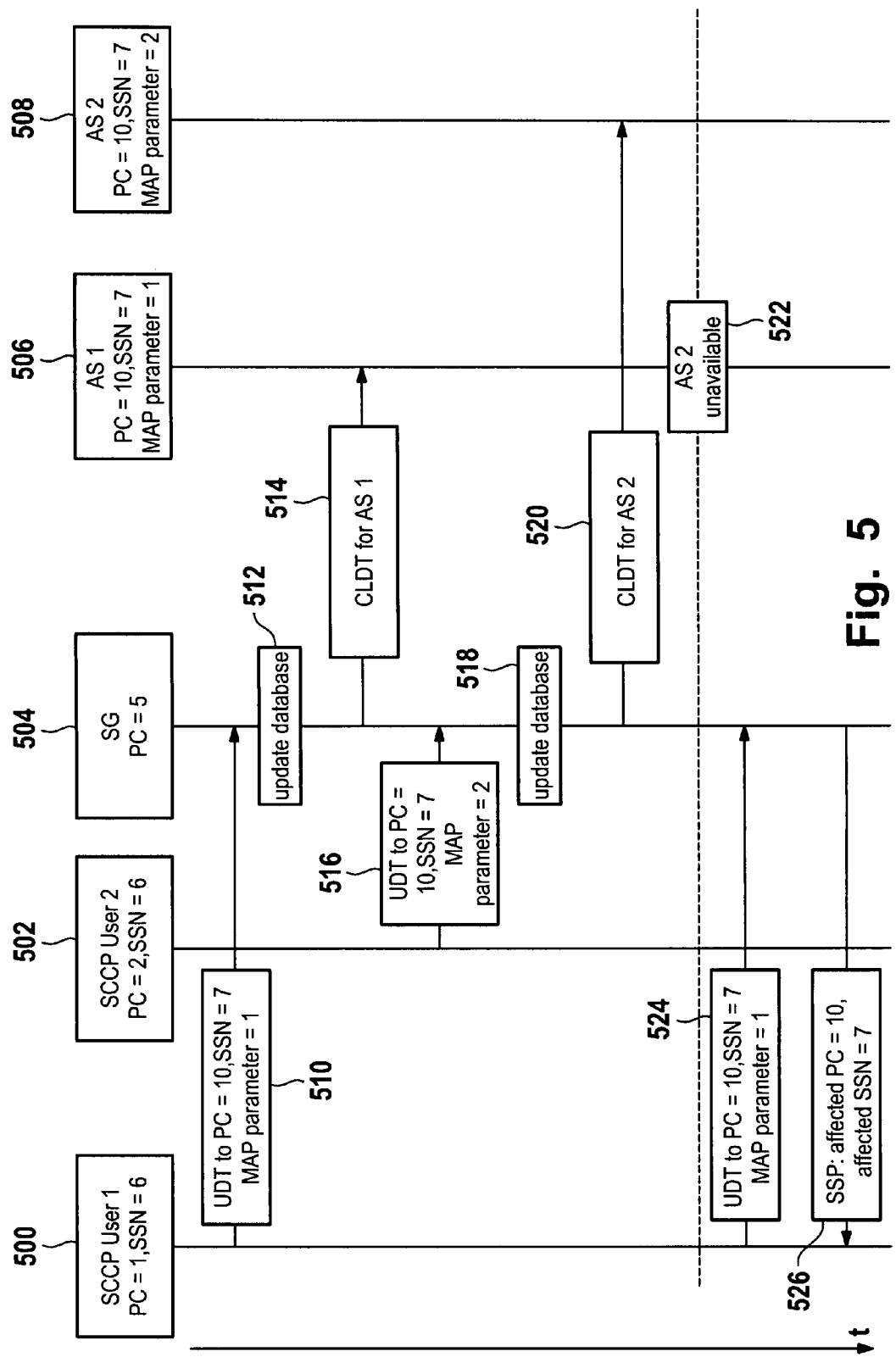
FIG. 5 depicts a sequence of operation diagram.

FIG. 5 depicts a sequence of operation diagram in which a SCCP user 1 500 with a point code (PC=1) and a subsystem number (SSN=6) and a SCCP user 2 502 with a point (PC=2) and a subsystem number (SSN=6), are requesting AS1 506 or AS 2 508, respectively. Both application servers share the same point code and subsystem number (PC=10, SSN=7) but differ in the MAP parameter (MAP=1 for AS1 and MAP=2 for AS 2).

In step 510 SCCP user 1 500 sends a service call for application server 1 506. The service call is received by the signaling gateway 504 and routed to application server 1 506. In step 512 the database is updated by an entry which comprises the point code of SCCP user 1 500, the point code, the subsystem number and the MAP parameter of application server 1 506. In step 514 a CLDT message is sent to application server 1 506.

In step 516 a service call is received from SCCP user 2 502 which requests application server 2 508. In step 518 a second entry is created in which the point code of the SCCP user 2 502 as well as the point code, the subsystem number, and the MAP parameter of application server AS2 508 are stored. In step 520 a CLDT message is sent to application server 2 508. In step 522, AS2 508 becomes unavailable so that for the SCCP service call which is received in step 524 from SCCP user 1 500 and which requests application server 1 506 a SSP SCCP management message is generated in step 526. If an error option is activated on the received message then a subsystem failure message is sent.

| List of Reference Numerals | |
|---|---|
| 100 | Block diagram of SIGTRAN network |
| 102 | Switched circuit network |
| 104 | Gateway |
| 106 | IP network |
| 108 | Timestamp |
| 110 | Service |
| 112 | Database |
| 114 | Given period of time |
| 116 | Service identifier |

-continued

| List of Reference Numerals | |
|---|---|
| 118 | Group of application servers |
| 120 | Application server |
| 122 | Application server identifier |
| 124 | Non-volatile memory device |
| 126 | Entry |
| 128 | Service call |
| 130 | Microprocessor |
| 132 | Computer program product |
| 134 | Calling party |
| 136 | Control message |
| 138 | Application server status |
| 140 | Control message request |
| 142 | List |
| 300 | SCCP user 1 |
| 302 | Signaling gateway |
| 304 | Application server 1 |
| 306 | Receiving service call |
| 308 | Updating database |
| 310 | Sending CLDT |
| 312 | Application server 1 unavailable |
| 314 | Receiving service call |
| 316 | Checking database |
| 318 | Sending SSP |
| 320 | Receiving SSP |
| 322 | Sending SSP |
| 324 | Application server 1 unavailable |
| 326 | Receiving SSP |
| 328 | Sending SSA |
| 400 | SCCP user 1 |
| 402 | Signaling gateway |
| 404 | Application server 1 |
| 406 | Application server 2 |
| 408 | Receiving service call |
| 410 | Updating database |
| 412 | Sending CLDT |
| 414 | Application server 1 unavailable |
| 416 | Receiving service call |
| 418 | Updating database |
| 420 | Sending CLDT |
| 422 | Receiving service call |
| 424 | Application server 2 unavailable |
| 426 | Receiving service call |
| 428 | Sending SSP management message |
| 500 | SCCP user 1 |
| 502 | SCCP user 2 |
| 504 | Signaling gateway |
| 506 | Application server 1 |
| 508 | Application server 2 |
| 510 | Receiving service call |
| 512 | Updating database |
| 514 | Sending CLDT |
| 516 | Receiving service call |
| 518 | Updating database |
| 520 | Sending CLDT |
| 522 | Application server 2 unavailable |
| 524 | Receiving service call |
| 526 | Sending SSP management message |

The invention claimed is:

1. A method of coupling a switched circuit network and an internet protocol network, said switched circuit network and said internet protocol network being interconnected by a gateway, said gateway comprising a database, said switched circuit network comprising a service, said service being identified by a service identifier, said internet protocol network comprising a group of application servers, said group of application servers comprising at least one application server, each of the at least one application server being identified by a specific application server identifier, said method comprising:

generating an entry in said database in response to a service call requesting said service if said service call is routed to an available application server, said service call being received from a calling party, said calling party being located on said switched circuit network, said entry comprising said service identifier and said specific application server identifier of said available application server;

deleting said entry after a given period of time;

sending a control message to said calling party in response to said service call if said service call is routed to an unavailable application server and if only the specific application server identifier of said unavailable application server is comprised in said database or if said service call is routed to an unavailable application server and if all application servers of said group of application servers are unavailable and if the specific application server identifiers of all application servers of said group of application servers are comprised in said database.

2. The method of claim 1, said method further comprising:
sending a control message to a calling party in response to a control message request received from said calling party, said control message request requesting the availability of said service, said service being linked to an application server, said application server being comprised in said group of application servers, said control message being sent if said application server is unavailable and if only the specific application server identifier of said application server is comprised in said database or if all application servers of said group of application servers are unavailable and if the specific application server identifiers of all application servers of said group of application servers are comprised in said database.

3. The method of claim 1, wherein said entry further comprises a timestamp, wherein said timestamp specifies the point in time when said entry is created, and wherein said entry is deleted after a given period of time has been spent with respect to said timestamp.

4. The method of claim 1, wherein said database comprises a list, said list comprising rules for assigning an application server comprised in said group of application servers to a service, said method comprising:

sending a control message or a second control message in response to an application server status change of said application server to said service if only said application server identifier of said application server is stored in said database.

5. The method of claim 1, wherein said switched circuit network is a signaling system 7 network, wherein said gateway is a signaling gateway, wherein said at least one service is a signaling connection control part (SCCP) service, wherein said service identifier is a point code, wherein said group of application servers is a group of application servers sharing the same point code and subsystem number, wherein said application server identifier is a MAP parameter, wherein said control message is a subsystem prohibited SCCP management message, and wherein said service call is a unit data SCCP message, and wherein said control message request is a subsystem test SCCP management message.

6. A non-transitory computer program product comprising computer executable instructions for performing a method in accordance with claim 1.

7. An electronic apparatus for coupling a switched circuit network and an internet protocol network, said switched circuit network and said internet protocol network being interconnected by a gateway, said gateway comprising a database, said switched circuit network comprising a service, said service being identified by a service identifier, said internet protocol network comprising a group of application servers, said group of application servers comprising at least one application server, each of the at least one application server being identified by a specific application server identifier, said electronic apparatus comprising:

means for generating an entry in said database in response to a service call requesting said service if said service call is routed to an available application server, said service call being received from a calling party, said calling party being located on said switched circuit network, said entry comprising said service identifier and said specific application server identifier of said available application server;

means for deleting said entry after a given period of time;

means for sending a control message to a calling party in response to said service call if said service call is routed to an unavailable application server and if only the specific application server identifier of said unavailable application server is comprised in said database or if said service call is routed to an unavailable application server and if all application servers of said group of application servers are unavailable and if the specific application server identifiers of all application servers of said group of application servers are comprised in said database.

8. The electronic apparatus of claim 7, said electronic apparatus further comprising:

means for sending a control message to a calling party in response to a control message request received from said calling party said control message request requesting the availability of said service, said service being linked to an application server, said application server being comprised in said group of application servers, said control message being sent if said application server is unavailable and if only the specific application server identifier of said application server is comprised in said database or if all application servers of said group of application servers are unavailable and if the specific application server identifiers of all application servers of said group of application servers are comprised in said database.

9. The electronic apparatus of claim 7, wherein said database comprises a list, said list comprising rules for assigning an application server comprised in said group of application servers to a service, said electronic apparatus comprising:

means for sending a control message or a second control message in response to an application server status change of said application server to said service if only said application server identifier of said application server is stored in said database.

10. The electronic apparatus of claim 7, wherein said switched circuit network is a signaling system 7 network, wherein said gateway is a signaling gateway, wherein said at least one service is a signaling connection control part (SCCP) service, wherein said service identifier is a point code, wherein said group of application servers is a group of application servers sharing the same point code and subsystem number, wherein said application server identifier is a MAP parameter, wherein said control message is a subsystem prohibited SCCP management message, and wherein said service call is a unit data SCCP message, and wherein said control message request is a subsystem test SCCP management message.

11. A method of operating a gateway to manage communications between a switched circuit network and an internet protocol network, the switched circuit network and the internet protocol network connected by the gateway, the gateway including a database, the switched circuit network including a service identified by a service identifier, the internet protocol network including a group of application servers including a first application server, wherein each application server in the group is identified by an application server identifier, the method comprising:

receiving at the gateway, a service call requesting the service, from a calling party on the switched circuit network, for routing to the first application server on the internet protocol network;

if the first application server is available to accept the service call and the service call is routed to the first application server, generating an entry in the database of the gateway, wherein the entry includes the service identifier and the first application server identifier;

if the first application server is not available to accept the service call and the service call is routed to the first application server when it is not available, sending a control message to the calling party on the switched circuit network.

12. The method of claim 11, wherein sending a control message comprises sending the control message if the database of the gateway includes the first application server identifier but no other application server identifier from the remaining application servers in the group of application servers on the internet protocol network.

13. The method of claim 11, wherein sending a control message comprises sending the control message if the database of the gateway includes the first application server identifier and one or more additional application server identifiers from the remaining application servers in the group of application servers on the internet protocol network, and if the one or more additional application servers is not available to accept the service call.

14. The method of claim 11, the method further comprising:

receiving at the gateway, a control message request requesting the availability of the service, wherein the service is linked to an application server in the group of application servers.

15. The method of claim 11, wherein the entry generated in the database of the gateway includes a timestamp.

16. The method of claim 15, wherein the timestamp is associated with the time when the entry is generated.

17. The method of claim 11, the method further comprising:

deleting the entry from the database of the gateway after a predetermined period of time.

18. The method of claim 17, wherein the predetermined period of time is associated with the timestamp.

* * * * *

UNITED STATES PATENT AND TRADEMARK OFFICE
CERTIFICATE OF CORRECTION

| | | |
|---|---|---|
| PATENT NO. | : 7,966,656 B2 | Page 1 of 1 |
| APPLICATION NO. | : 11/717153 | |
| DATED | : June 21, 2011 | |
| INVENTOR(S) | : Philippe Bouckaert et al. | |

It is certified that error appears in the above-identified patent and that said Letters Patent is hereby corrected as shown below:

In column 11, line 28, in Claim 8, delete "party" and insert -- party, --, therefor.

Signed and Sealed this
Seventeenth Day of July, 2012

David J. Kappos
*Director of the United States Patent and Trademark Office*